United States Patent [19]

Sagara et al.

[11] Patent Number: 4,653,329
[45] Date of Patent: Mar. 31, 1987

[54] PRESSURE DETECTOR AND STRAIN MEMBER THEREFOR

[75] Inventors: Tatsuo Sagara; Tadashi Sakaue, both of Tokyo, Japan

[73] Assignee: Ohkura Electric Co., Ltd., Tokyo, Japan

[21] Appl. No.: 781,986

[22] Filed: Sep. 30, 1985

[30] Foreign Application Priority Data

Oct. 5, 1984 [JP] Japan .................................. 59-207994
Oct. 5, 1984 [JP] Japan ........................... 59-150174[U]

[51] Int. Cl.⁴ ............................................... G01L 9/04
[52] U.S. Cl. ........................................ 73/726; 73/720; 73/862.65; 338/4; 338/42
[58] Field of Search ................ 73/726, 727, 720, 721, 73/777, 774, DIG. 4, 862.65, 862.64; 338/4, 42

[56] References Cited

U.S. PATENT DOCUMENTS 3,413,845 12/1968 Pugnaire .............................. 73/726
3,757,573 9/1973 Pechuk et al. .................... 73/862.65
3,969,934 7/1976 Raskin .............................. 73/862.64
4,408,496 10/1983 Dahle et al. .......................... 73/720

Primary Examiner—Donald O. Woodiel
Attorney, Agent, or Firm—Oblon, Fisher, Spivak, McClelland & Maier

[57] ABSTRACT

A circular diaphragm with an annular thin portion has a smooth front surface, and coaxial but spaced inner and outer cylinders are secured to a rear surface of the diaphragm across said annular thin portion. Opposite edges of a rectangular strain member which is operatively connected to the disphragm through the inner cylinder are secured to a free end of the outer cylinder.

13 Claims, 7 Drawing Figures

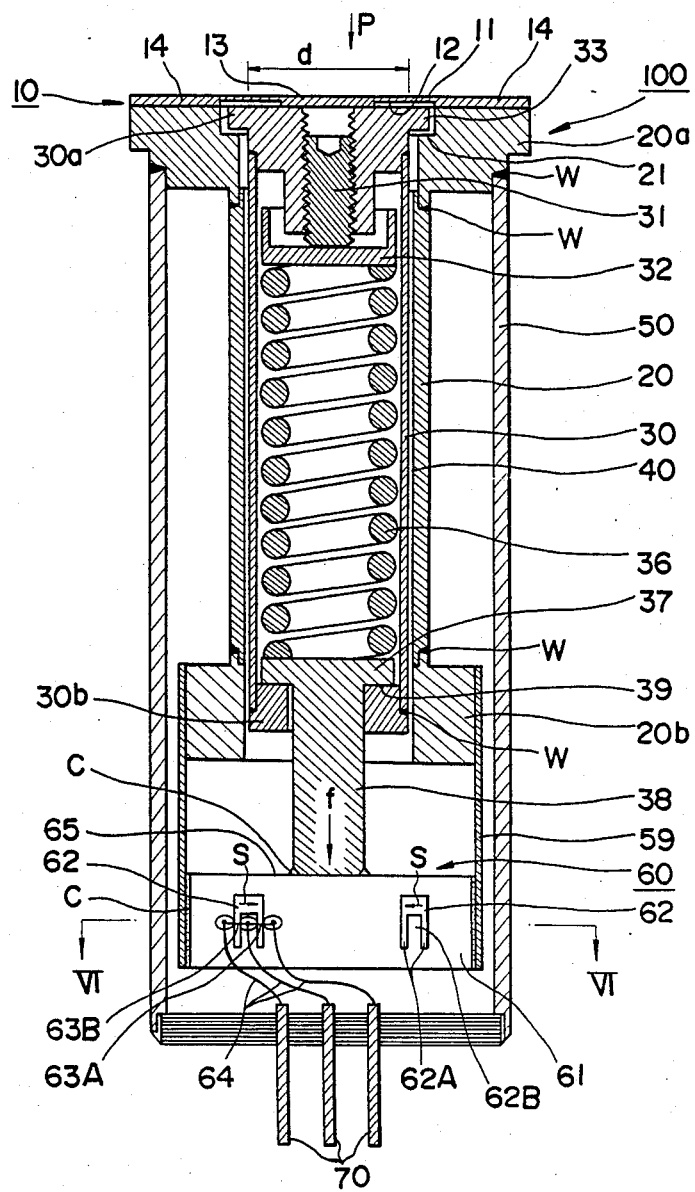

PRESSURE DETECTOR AND STRAIN MEMBER THEREFOR

BACKGROUND OF THE INVENTION

1. Field of the Invention

This invention relates to a pressure detector and a strain member therefor, and more particularly to a pressure detector which uses a special strain member. The strain member is rectangular and has windows formed between its opposing edge surfaces which are held stationary, so that when a force is applied to the strain member at a position between the opposing edge surfaces in parallel thereto the windows flex depending on the force thus applied. The pressure detector of the invention is particularly suitable for accurate pressure detection in an apparatus to be run at a high temperature, such as an internal combustion engine and a fluid processing plant like a food processing plant, over a wide temperature range in special surroundings, e.g., in a bacteriologically clean environment.

2. Description of the Prior Art

In food processing plants and automobile factories, there is an increasing demand for accurate measurement of the pressure under special conditions; namely, that that surface of the pressure detector which is to be in contact with fluid being measured must be flat and must be kept sufficiently clean for completely eliminating any bacteriological proliferation, and that accurate measurement must be ensured at a comparatively high temperature such as at 150° C.

In a typical pressure detector of the prior art as shown in FIG. 1, a flexible diaphragm 81 is fastened to a fixed member 82 in such a manner that a pressure-receiving portion 83 of the diaphragm 81 flexes in proportion to a pressure applied thereto. The deflection of the pressure-receiving portion 83 is transmitted to the free end of a cantilever type strain member 85 through a coupling means 84. The opposite end of the strain member 85 is fastened to a fixed member 82a, and a pair of strain-sensitive elements 86a and 86b are mounted on opposing surfaces of the strain member 85 in the proximity of the fastened end thereof.

The strain-sensitive elements 86a and 86b are made of metallic wires or semiconductors, and electric output signals from the strain-sensitive elements 86a and 86b indicate the deflection of the strain member 85 and hence the magnitude of the pressure acting on the pressure-receiving portion 83 of the diaphragm 81. Thus, the fluid pressure is converted into the deflection of the strain member 85 and then detected in the form of the above electric signals from the strain-sensitive elements 86a and 86b.

The pressure detector of the prior art as shown in FIG. 1, however, has shortcomings in that the surface of the flexible diaphragm 81 is uneven with recessed portions where solid material is likely to be precipitated in a hardly removable manner so as to make it difficult to maintain high accuracy and bacteriological cleanness, and that the temperature of the fluid being measured is easily transmitted to the strain member 85, resulting in an increased temperature error in the measurement.

Besides, the cantilever type strain member 85 of the prior art has a number of shortcomings; namely, that coupling portions and parts (not shown) which join the fastened end of strain member 85 to the fixed member 82a are susceptible to slight strain due to the flexing of the strain member 85 resulting in a measurement error; that, if the above-mentioned coupling portions and parts are made sturdy enough to prevent any strain thereat, they become bulky and miniaturization becomes difficult; that, when the strain member 85 is made of metallic material to withstand mechanical loading, the difference in thermal expansion between the metallic strain member 85 and the strain-sensitive elements 86a, 86b tends to cause a measurement error; and that, when an organic adhesive is used to join the strain sensitive elements 86a, 86b to the strain member 85 so as to make up for the difference in thermal expansion therebetween, the organic adhesive tends to cause a measurement error.

SUMMARY OF THE INVENTION

Therefore, an object of the present invention is to obviate the above-mentioned shortcomings of the prior art by providing an improved strain member.

Another object of the invention is to provide an improved pressure detector by using the above strain member, which detector is suitable for measuring fluid pressure at a high temperature in an apparatus requiring a flat measuring surface such as an internal combustion engine, a food processing plant or the like. The pressure detector of the invention is particularly suitable for use under bacteriologically clean conditions.

A preferred embodiment of the strain member according to the invention uses a rectangular plate having a pair of opposing edges to be held stationary. A pair of windows are bored through the rectangular plate on opposite sides of a center line between the two edges to be held stationary. The bifurcated leg portions are defined by a boss that extends from one edge of the window in parallel to the above-mentioned edges to be held stationery. One of the window is of U-shape with its bifurcated leg portions disposed in parallel to the edges to be held stationary. When the opposing edges are held stationary, if a force in parallel to such opposing edges is applied to the rectangular plate at an edge between the opposing edges, a strain is produced along the edges of the U-shaped window, more noticeably at the boss thereof, depending on the force thus applied.

In another embodiment of the invention, both of the two windows to be bored through the rectangular plate are of identical U-shape for simplifying the machining.

The holding of the two opposing edges of the rectangular plate of the strain member of the invention ensures easy mounting and stable operation of the strain member, as compared with the holding of only one end in the case of the conventional cantilever type strain member.

To detect strain in the strain member, in the above U-shaped window, a strain-sensitive element is provided across one of its leg portions and another strain-sensitive element is provided across the other one of the leg portions. The two strain-sensitive elements may or may not be connected in series at a position between the two parallel leg portions. The strain-sensitive elements are adapted to produce electric signals which represent the strain in the strain member.

For eliminating measurement error at a high temperature due to difference in thermal expansion between the rectangular plate and the strain-sensitive elements, both the plate and the elements are preferably made of a common semiconductor material. More preferably, the rectangular plate is made of a single crystal semiconductor.

In a preferred embodiment of the pressure detector according to the invention, a metallic disk diaphragm having a smooth front surface is used to provide a smooth flat measuring surface in the apparatus for detecting its inside pressure. The smooth flat measuring surface is particularly suitable for application where bacteriological cleanness is required. An annular recess is formed on the rear surface of the disk diaphragm, so as to define an annular thin portion around the center thereof. One end of an outer cylinder is secured to the rear surface of the disk diaphragm along a circle enclosing the annular recess in a concentric manner therewith. A strain member of the above-mentioned type is secured to the opposite end of the outer cylinder. An inner cylinder is concentrically disposed in the outer cylinder, while securing one end the inner cylinder to the rear surface of the disk diaphragm along a circle surrounded by the annular recess. The opposite end of the inner cylinder is operatively connected to the strain member. A strain-sensitive means is mounted on the strain member so as to detect the strain thereof.

A preferred embodiment of the strain-sensitive means to be mounted on the pressure detector consists of a first strain-sensitive element extending across one of the two leg portions at one of the U-shaped windows and a second strain-sensitive element extending across the other leg portion of that U-shaped window. The first and second strain-sensitive elements may or may not be connected in series at a position between the two parallel leg portions. The strain-sensitive elements are adapted to produce electric signals which represent said strain. The first and second strain-sensitive elements are preferably made of the same material as the rectangular plate. With the strain-sensitive elements which are made of the same material as the rectangular plate and directly connected to the rectangular plate, measurement error at a high temperature due to difference in the thermal expansion between the strain-sensitive means and the strain member is completely eliminated. Accordingly, accurate pressure measurement is ensured at a high temperature.

One of the two windows to be bored through the rectangular plate of the strain member may not be of U-shape, but it can be a rectangular window.

BRIEF DESCRIPTION OF THE DRAWINGS

For a better understanding of the invention, reference is made to the accompanying drawings, in which:

FIG. 4 is a schematic sectional view of a pressure detector according to the invention;

Like parts are designated by like numerals and symbols throughout different views of the drawings.

DESCRIPTION OF THE PREFERRED EMBODIMENT

Figure 2:
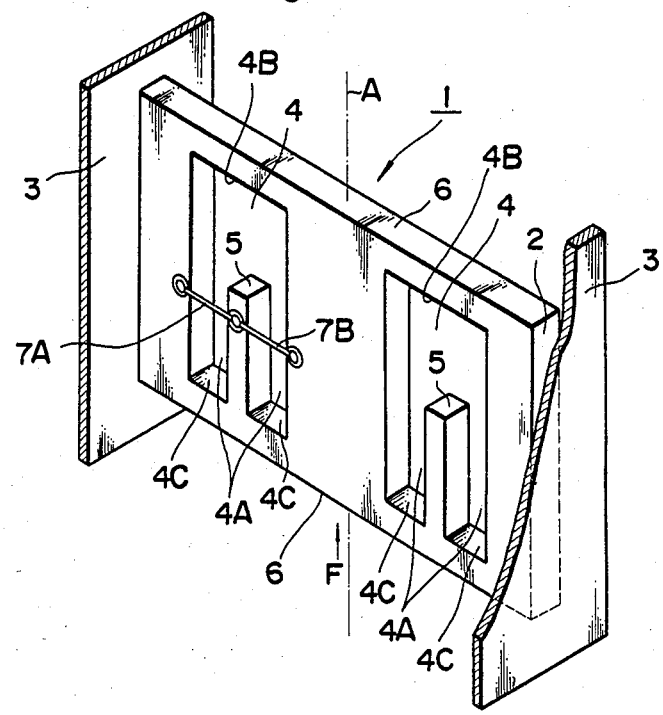
FIG. 2 is a schematic perspective view of a strain member according to the present invention.

FIG. 2 shows a rectangular plate 1 forming a strain member of the invention. In the figure, vertical edge surfaces 2, 2 at opposing ends of the rectangular plate 1 are fixed to holding members 3, 3, so that the rectangular plate 1 is held at the two fixed surfaces 2, 2 in a symmetrical manner with respect to a central axis A which is the center line between the two edges. A pair of U-shaped windows 4, 4 are bored through the plate 1 on opposite sides of the central axis A. Preferably, the two windows 4, 4 are symmetrically located with respect to the central axis A, but the invention is not restricted to such symmetrical arrangement of the windows 4,4. Bifurcated leg portions 4A of the U-shaped window 4 are disposed in parallel to the fixed surface 2 or the vertical opposing edges. Although the windows 4 in FIG. 2 are inversely U-shaped, it is possible to make them upright U-shaped provided that the bifurcated leg portions 4A are parallel to the fixed surfaces 2. Each window 4 has a boss 5 extending between the leg portions 4A in parallel to the fixed surfaces 2.

Two movable edge surfaces 6 extend between the fixed surfaces 2, and a force F from the outside is applied to either of the two movable edge surfaces 6. In the example of FIG. 2, the external force F is applied to the lower one of the movable edge surfaces 6 in an upward directon. It is also possible to apply such external force F to the upper movable edge surface 6. A strain is produced in the edge of the window 4 in response to the force F thus applied.

Preferably, strain-sensitive elements 7A and 7B made of a single crystal semiconductor are disposed across the leg portions 4A of one window 4 by bonding them to the boss 5 and the window edges facing the boss 5 without using any organic adhesive, as shown in FIG. 2. More preferably, the strain-sensitive elements 7A and 7B are made of the same material as the rectangular plate 1, and they are bonded to the plate 1 by glass. The strain-sensitive elements 7A and 7B vary their electric resistances depending on strains therein. An electric signal indicating the strain in the strain-sensitive elements 7A and 7B can be produced, for instance, by connecting them to a bridge circuit (not shown). The generation of such electric signal by using the bridge circuit is well known to those skilled in the art, so that details thereof will not be dealt with here.

In the present invention, the rectangular plate 1 is preferably made of a semiconductor, more preferably a single crystal semiconductor, because when both the plate 1 and the strain-sensitive elements 7A, 7B are made of the same material of the same crystal structure, no strain will be produced in the strain-sensitive elements due to mere ambient temperature change. The reason for using a pair of U-shaped widows 4 is in that, when a force F is applied to the plate 1, strains are generated in symmetry with respect the central axis A so as to equalize the loading at the two fixed surfaces 2, 2. With the equal loading, deformation at the fixed surfaces 2, 2 can be prevented even if the holding members 3 carrying them are of simple structure. For simplicity, one of the windows 4 may be made rectangular so as to make only one of them U-shaped.

The operation of the strain member made of the rectangular plate 1 will be explained by referring to FIG. 3. In each window 4, a leg root surface 4B extending across root portions of the two leg portions 4A and leg tip surfaces 4C at the extended ends of the two leg portions 4A define thin wall portions which are parallel to the movable edge surfaces 6. When the external force F is applied in parallel to the central axis, such thin wall portions flex as shown by dot-lines of FIG. 3 in a considerably exaggerated manner. More particularly, the movable edge surfaces 6 are translated in parallel in such a manner that the boss 5 between the two leg portions 4A in each window 4 tends to incline toward the nearest one of the fixed surfaces 2 as shown by the dot-lines of FIG. 3 with similar exaggeration. Thus, the rectangular plate 1 of the strain member produces a strain at its window 4 in response to the external force F applied thereto as shown with exaggeration by the dot-lines of FIG. 3.

If the angular displacement of the leg root surface 4B or the leg tip surface 4C is represented by $\theta$ and the length of the leg root surface 4B is represented by l, then the maximum displacement $\delta_1$ of the leg root surface 4B or the leg tip surfaces 4C for a given force F and the maximum displacement $\delta_2$ of the boss 5 corresponding to the above displacement $\delta_1$ can be approximated by the following equations.

$$\delta_1 \simeq l\theta$$

$$\delta_2 \simeq h\theta$$

Here, h is the height of the boss 5.

Figure 3:
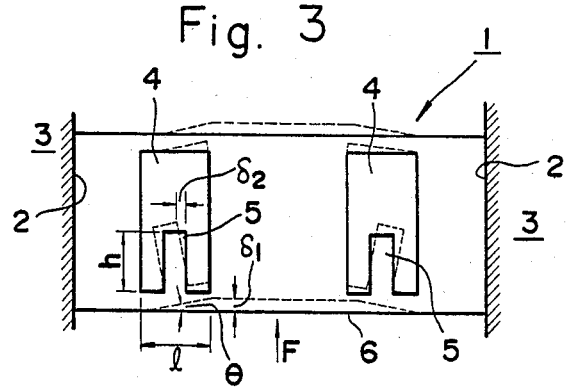
FIG. 3 is an explanatory diagram showing the manner in which the strain member of FIG. 2 operates.

When two strain-sensitive elements 7A and 7B are provided as shown in FIG. 2, the strain of FIG. 3 causes a compression in the one strain-sensitive element 7A while causing a tension in the other strain-sensitive element 7B. Accordingly, the force F can be detected at a high sensitivity with a high accuracy in the so-called push-pull system.

The strain member as shown in FIG. 2 and FIG. 3 has the following advantages.

(a) Since the movable edge surface 6 where the external force F is applied translates in a substantially parallel manner, a small deviation of the point of applying the external force F from the central axis A will not affect the measurement.

(b) Since no bending stress is caused in the holding members 3 from the fixed surfaces 2, the fixed surfaces 2 can be fastened to the holding members 3 with comparatively simple structure so as to facilitate miniaturization without sacrificing any accuracy.

(c) Temperature error in the measurement due to the difference in thermal expansion between the rectangular plate 1 and the strain-sensitive elements 7A, 7B can be eliminated by making them from the same material.

(d) Since both the rectangular plate 1 and the strain-sensitive elements 7A, 7B can be made of heat-resisting materials, they can be bonded together by glass, so that temperature error and creep error due to bondage with organic adhesive can be eliminated.

(e) In a force or pressure measuring system, the holding member 3 for the fixed surfaces 2 of the rectangular plate 1 and a member for applying the external force F to the rectangular plate 1 can be disposed in a coaxial manner.

One of the essential features of the invention is to construct a pressure detector by using the above-mentioned strain member made of the rectangular plate 1. More particularly, referring to FIG. 4, a preferred embodiment of the pressure detector 100 according to the invention uses a strain member 60 made of a rectangular plate 61 with a pair of U-shaped windows 62.

Figure 1:
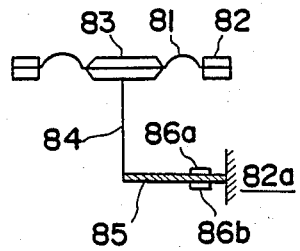
FIG. 1 is a schematic block diagram of a pressure detector of the prior art, which detector uses a cantilever type strain member.
Figure 5A:
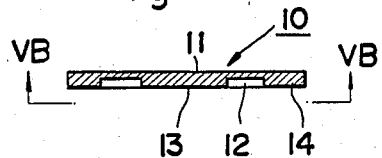
FIG. 5A and FIG. 5B a sectional view and a rear view of a metallic disk diaphragm which is used in the pressure detector of FIG. 4.
Figure 5B:
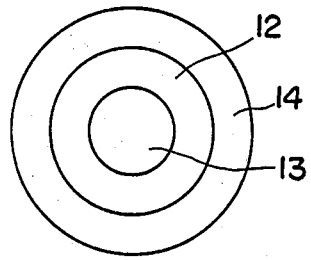

FIG. 5A and FIG. 5B show a metallic disk diaphragm 10 to be used in the pressure detector 100 of the invention. The disk diaphragm 10 has a smooth front surface 11 and a rear surface with an annular recess 12 formed by electro-discharge machining or etching. The recess 12 provides an annular thin portion in the disk diaphragm 10. As compared with the conventional flexible diaphragm 81 of FIG. 1, the disk diaphragm 10 of FIGS. 5A and 5B is featured in that the weight is reduced, that the resistivity against vibratory impact is improved, and that precipitation of solid matters is reduced and thorough cleaning of the front surface is easy. In the figures, the numeral 13 represents a central portion surrounded by the annular recess 12, and the numeral 14 represents a peripheral annular portion surrounding the annular recess 12.

Referring to FIG. 4, the disk diaphragm 10 converts the pressure P to be measured into a force f as given by the following equation.

$$f = (\pi d^2/4)P \qquad (1)$$

Here, d is the average of the inner diameter and the outer diameter of the annular recess 12.

In the example of FIG. 4, the top end of an outer cylinder 20 is connected to a base member 20a by laser welding, as shown by a welded portion W. The base member 20a is in turn connected to the rear surface of the peripheral annular portion 14 of the disk diaphragm 10 along a circle surrounding the annular recess 12 in a concentric manner. The connection of the base member 20a to the top of the outer cylinder 20 is not restricted to the laser welding, and any other suitable bonding method can be used for that connection. It is also possible to directly connect the outer cylinder top to the diaphragm 10. The opposite end of the outer cylinder 20 is connected to a force ring 20b through a welding portion W. The force ring 20b in turn holds a pair of holder plates 59 carrying the strain member 60. The embodiment of FIG. 4 uses adhesive layers C for connecting the strain member 60 to the holder plates 59, but any other suitable bonding means can be used for securing the member 60 to the plates 59.

Thus, the strain member 60 is integrally secured to the lower end of the outer cylinder 20. For simplicity, the strain member 60 may be directly connected to the lower end of the outer cylinder 20. As previously mentioned, the strain member 60 comprises a rectangular plate 61, preferably made of a semiconductor, having substantially the same structure as shown in FIG. 2 and FIG. 3. In a preferred embodiment, the plate 61 is symmetrical relative to the axial center line of the outer cylinder 20 and has the previously mentioned pair of U-shaped windows 62 bored therethrough on opposite sides of the above axial center line.

An inner cylinder 30 is concentrically disposed in the outer cylinder 20 with a spacing 40 therefrom. The top end of the inner cylinder 30 is connected to a head plug 30a through a welded portion W. The head plug 30a in turn engages the rear surface of the central portion 13 of the disk diaphragm 10. It is also possible to dispense with the head plug 30a so as to directly connect the top of the inner cylinder 30 to the disk diaphragm 10. A shoulder portion 39 may be formed at the lower end of the inner cylinder 30 as an integral portion thereof this embodiment is not illustrated) or by securing an inner ring member 30b thereat. The lower edge surface of a flange 37, which is integrally formed at the top end of a force rod 38, engages the shoulder portion 39 of the inner ring member 30b, and the lower end of the force rod 38 is bonded to a movable surface 65 of the rectangular plate 61 of the strain member 60.

A coiled spring 36 is disposed in the inner cylinder 30. The lower end of the coiled spring 36 engages the top surface of the flange 37 at the top of the force rod 38. The top end of the coiled spring 36 engages a spring seat 32 which receives a downward compression $f_o$ from an adjusting screw 31. The adjusting screw 31 is screwed in a tapped hole in the head plug 30a secured to the top of the inner cylinder 30. A stopper flange 33 is formed at the top end of the head plug 30a secured to the upper end of the inner cylinder 30. The lower surface of the stopper flange 33 normally faces but is spaced from a shoulder portion 21 which is integrally formed with the base member 20a secured to the upper end of the outer cylinder 20. When both the base member 20a and the head plug 30a are dispensed with, the shoulder portion 21 and the stopper flange 33 may be formed at the upper ends of the outer cylinder 20 and the inner cylinder 30, respectively.

As long as the force f of the equation (1) applied to the inner cylinder 30 is smaller than the above compression $f_o$, the coiled spring 36 urges the flange 37 at the top of the rod 38 toward the shoulder portion 39 at the lower end of the inner cylinder 30, so that the force f is transmitted to the movable surface 65 of the strain member 60. On the other hand, when the force f of the equation (1) exceeds the above compression $f_o$, the shoulder portion 39 at the lower end of the inner cylinder 30 leaves the flange 37 at the top of the rod 38 and descends, so that the force applied to the strain member 60 never exceeds the compression $f_o$. Thus, the strain member 60 is protected from excessive loading. When the force f of the equation (1) further increases, the stopper flange 33 at the top end of the inner cylinder 30 engages the shoulder portion 21 of the outer cylinder 20, so that the inner cylinder 30 is prevented from descending relative to the outer cylinder 20.

Figure 6:
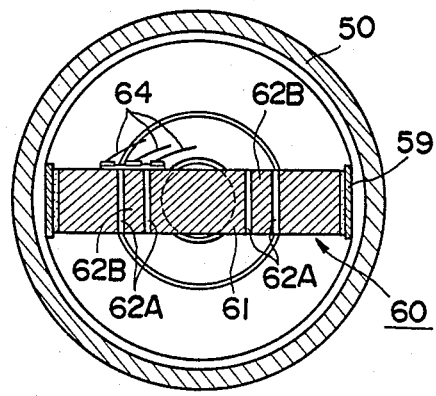
FIG. 6 is a sectional view taken along the line VI—VI of FIG. 4.

A protective cylinder 50 is provided so as to surround the outside of the outer cylinder 20. Accordingly, the strain member 60 is protected against impacts from the outside of the pressure detector 100, and errors due to external thermal and physical disturbances are eliminated. Terminals 70 are provided at the bottom of the protective cylinder 50, and lead wires 64 connect the strain-sensitive elements 63A and 63B on the strain member 60 to the terminals 70 as shown in FIG. 4 and FIG. 6.

In operation, when a pressure P to be detected is is applied to the smooth front surface 11 of the metallic disk diaphragm 10, the pressure P is converted into the corresponding force f as shown by the equation (1). The force f is transmitted through the inner cylinder 30 to the movable edge surface 65 of the strain member 60 carried by the outer cylinder 20. A strain corresponding to the force f is generated in the edges of the U-shaped window 62 of the rectangular plate 61, which is made of a semiconductor in the case of the illustrated embodiment. Referring to FIG. 4, a boss 62B between two parallel leg portions 62A of the U-shaped window 62 moves as shown by the arrow S in response to the application of the force f onto the movable edge surface 65.

Thus, a compression is caused in one strain-sensitive element 63A while a tension is caused in the other strain-sensitive element 63B. Output signals from the strain-sensitive elements 63A and 63B in response to such compression and tension are delivered to an outside measuring circuit (e.g., a bridge circuit (not shown)) through the lead wires 64 and the terminals 70, so that an output of the pressure detector 100 indicating the pressure P can be produced.

As described in the foregoing, a pressure detector according to the present invention uses a metallic disk diaphragm with a smooth front surface and a strain member held with a distance from the metallic disk diaphragm by the outer and inner cylinders, so that the following features are achieved.

(i) The surface to be in contact with fluid to be measured can be made flat and can be kept bacteriologically clean.

(ii) The measurement error at the strain member due to influence of the temperature of the fluid being measured can be minimized.

(iii) The movement of the inner cylinder is parallel to the outer cylinder, so that no bending moment is caused in the members for transmitting the force from the disk diaphragm to the strain member, whereby inefficiency and errors due to such bending moment can be eliminated.

(iv) Machining necessary to make the pressure detector is comparatively easy.

(v) Due to the symmetrical structure with respect to the central axis of the outer cylinder, the connection between the disk diaphragm and the strain member is easy to build and can be made in a compact form.

What is claimed is:

1. A strain member comprising a rectangular plate having a center line, a pair of opposing edges to be held stationary, and a pair of windows bored through said rectangular plate on opposite sides of said center line, at least one of said windows having a boss extending from one edge thereof in parallel to said edges to be held stationary so as to define a U-shaped window opening with bifurcated leg portions, whereby, when said opposing edges are held stationary and a force is applied to said rectangular plate at an edge thereof between said opposing edges in parallel to said center line, said boss is deflected in a direction perpendicular to said force.

2. A strain member as set forth in claim 1, wherein said pair of windows are both U-shaped, each one of said pair of windows having bifurcated leg portions that are parallel to said edges to be held stationary.

3. A strain member as set forth in claim 1, wherein said pair of windows are both U-shaped and are bored through said rectangular plate in symmetry with respect to said center line, each one of said pair of windows having bifurcated leg portions that are parallel to said edges to be held stationary.

4. A strain member as set forth in claim 3, wherein each one of said pair of windows has a first strain-sensitive element extending across one of said bifurcated leg portions and a second strain-sensitive element extending across the other one of said bifurcated leg portions, said strain-sensitive elements being adapted to produce electric signals which represent deflections of said boss.

5. A strain member as set forth in claim 1, wherein said rectangular plate is made of a semiconductor.

6. A strain member as set forth in claim 1, wherein said rectangular plate is made of a single crystal semiconductor.

7. A strain member as set forth in claim 1, wherein said at least one of said pair of windows has a first strain-sensitive element extending across one of said bifurcated leg portions and a second strain-sensitve element extending across the other one of said bifurcated leg portions, said strain-sensitive elements being adapted to produce electric signals which represent deflections of said boss.

8. A pressure detector comprising:
(a) a disk diaphragm having a center, a smooth front surface, and a rear surface with an annular recess about the center of said disk diaphragm so as to form an annular thin portion in said disk diaphragm;
(b) an outer cylinder having a longitudinal central axis, a first end of said outer cylinder being secured to the rear surface of said disk diaphragm along a circle surrounding said annular recess in a concentric manner;
(c) an inner cylinder concentrically disposed in said outer cylinder and having a first end thereof secured to the rear surface of said disk diaphragm along a circle surrounded by said annular recess;
(d) a strain member comprising a rectangular plate having a pair of edges disposed on opposite side of said longitudinal central axis of said outer cylinder and secured to a second end of said outer cylinder, a pair of windows being bored through said rectangular plate on opposite sides of said longitudinal central axis, at least one of said pair of windows having a boss extending from one edge thereof in parallel to said longitudinal central axis so as to define a U-shaped window opening with bifurcated leg portions, said second end of said inner cylinder being operatively connected to an edge of said rectangular plate between said pair of edges thereof; and
(e) a strain-sensitive means mounted on said strain member across at least one of said bifurcated leg portions thereof,
whereby, when a pressure is applied to said strain member from said disk diaphragm through said inner cylinder, said boss of said at least one of said pair of windows is deflected in a direction perpendicular to said longitudinal central axis and said strain-sensitive means detects the deflection.

9. A pressure detector as set forth in claim 8, wherein each one of said pair of windows has a boss extending from one edge thereof in parallel to said longitudinal central axis so as to define a U-shaped window opening with bifurcated leg portions.

10. A pressure detector as set forth in claim 8, wherein said pair of windows are bored in symmetry with respect to said longitudinal central axis.

11. A pressure detector as set forth in claim 8, wherein said rectangular plate is made of a semiconductor.

12. A pressure detector as set forth in claim 8, wherein said rectangular plate is made of a single crystal semiconductor.

13. A pressure detector as set forth in claim 8, wherein said strain-sensitive means comprise:
(a) a first strain-sensitive element extending across one of said leg portions of said at least one of said pair of windows and
(b) a second strain-sensitive element extending across the other leg portion of said at least one of said pair of windows,
(c) said strain-sensitive elements being adapted to produce electric signals which represent deflections of said boss.

* * * * *